(12) United States Patent
Alger et al.

(10) Patent No.: US 7,184,779 B2
(45) Date of Patent: Feb. 27, 2007

(54) METHOD AND SYSTEM FOR DETERMINING DISPLACEMENT TIME OF A MOBILE USER TERMINAL EQUIPMENT

(75) Inventors: Michael Alger, Haar (DE); Thomas Lang, Munich (DE)

(73) Assignee: Vodafone Holding GmbH, Duesseldorf (DE)

( * ) Notice: Subject to any disclaimer, the term of this patent is extended or adjusted under 35 U.S.C. 154(b) by 0 days.

(21) Appl. No.: 10/492,322

(22) PCT Filed: Oct. 4, 2002

(86) PCT No.: PCT/DE02/03773

§ 371 (c)(1),
(2), (4) Date: Oct. 13, 2004

(87) PCT Pub. No.: WO03/034371

PCT Pub. Date: Apr. 24, 2003

(65) Prior Publication Data

US 2005/0037772 A1 Feb. 17, 2005

(30) Foreign Application Priority Data

Oct. 10, 2001 (DE) ............................... 101 49 943

(51) Int. Cl.
*H04Q 7/20* (2006.01)
(52) U.S. Cl. .............................. 455/456.5; 455/456.6; 455/433; 455/432.1; 342/357.09; 701/201
(58) Field of Classification Search ............ 455/404.2, 455/456.1–456.3, 456.5–456.6, 456.1–457, 455/403, 422.1, 432.1, 440–441, 569.2; 701/204, 207, 208, 209, 213–214, 201–202; 340/988, 989, 994, 995.19; 342/357.08, 342/357.09, 357.1, 357.13, 357.11

See application file for complete search history.

(56) References Cited

U.S. PATENT DOCUMENTS 5,465,289 A 11/1995 Kennedy, Jr.

(Continued)

FOREIGN PATENT DOCUMENTS

DE 19755891 A1 12/1997

(Continued)

*Primary Examiner*—Erika A. Gary
*Assistant Examiner*—Kamran Afshar
(74) *Attorney, Agent, or Firm*—Kriegsman & Kriegsman

(57) ABSTRACT

A method as well as a system are described for determining the travel time of at least one mobile user end device between a starting point (A) and an end point (E) that is spatially separated from it. To this end, specific pieces of information of at least one mobile user end device located at the starting point (A) and at the end point (E) are determined and each linked to a time marker. The specific pieces of information of the mobile user end devices are compared with one another electronically in at least one central processing unit. When the specific pieces of information of a mobile user end device are in agreement at the starting point (A) as well as at the end point (E), the time difference between the time markers is formed electronically in the central processing unit and the travel times are determined therefrom. The method can be carried out advantageously by the use of a cellular mobile wireless system (10), wherein the starting point (A) and the end point (E) are each formed by corresponding cells (12, 13) of the mobile wireless system (10). The determination of the travel time results from the data of the mobile wireless system (10).

22 Claims, 2 Drawing Sheets

U.S. PATENT DOCUMENTS

Figure 1:
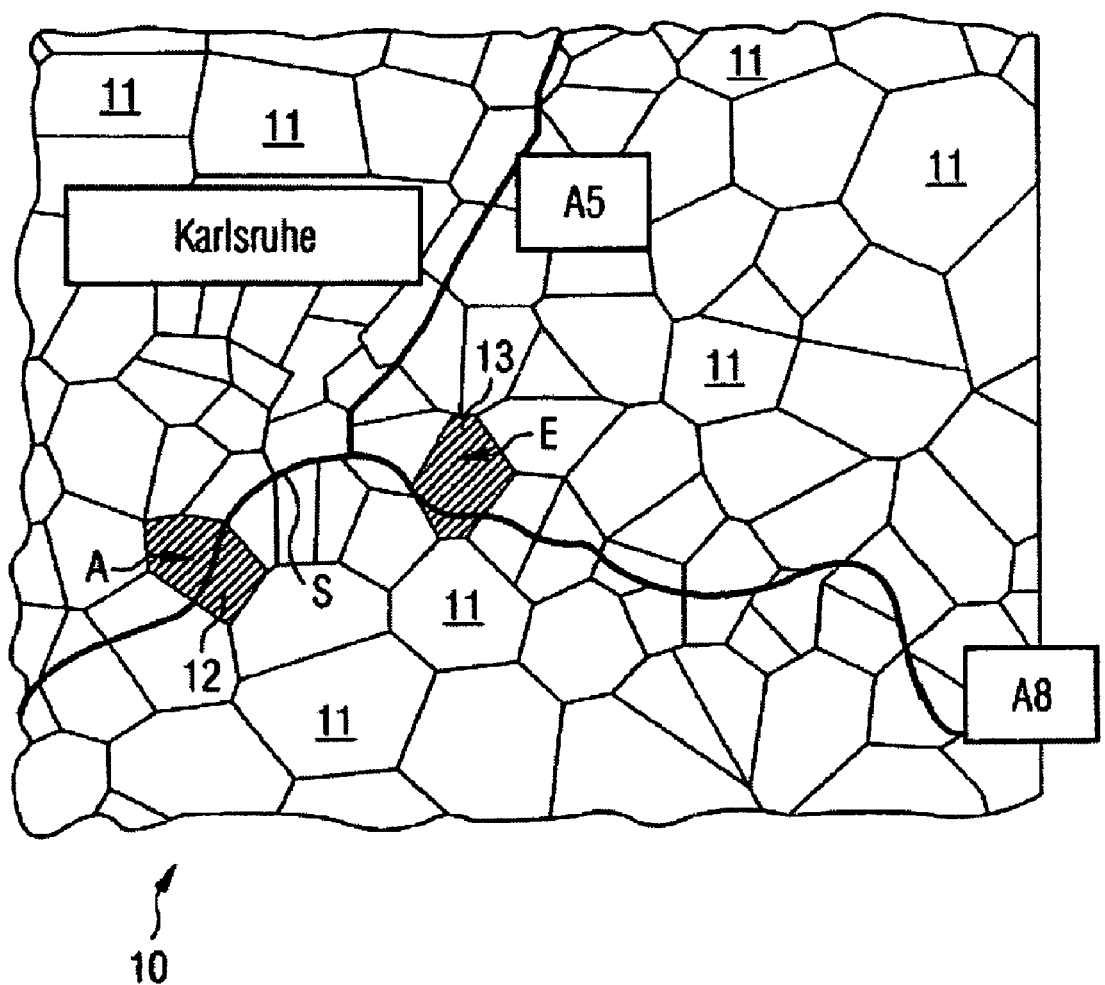

| | | | |
|---|---|---|---|
| 5,999,124 A * | 12/1999 | Sheynblat | 342/357.09 |
| 6,012,012 A | 1/2000 | Fleck et al. | |
| 6,230,011 B1 | 5/2001 | Guenther et al. | |
| 6,330,446 B1 * | 12/2001 | Mori | 455/435.2 |
| 6,381,533 B1 | 4/2002 | Crane et al. | |
| 6,584,401 B2 * | 6/2003 | Kirshenbaum et al. | 701/202 |
| 6,615,133 B2 * | 9/2003 | Boies et al. | 701/209 |
| 6,636,801 B2 * | 10/2003 | Curbow | 701/207 |
| 6,741,926 B1 * | 5/2004 | Zhao et al. | 701/201 |
| 7,082,365 B2 * | 7/2006 | Sheha et al. | 342/357.08 |
| 2003/0014180 A1 * | 1/2003 | Myr | 701/117 |
| 2003/0109266 A1 * | 6/2003 | Rafiah et al. | 455/456 |
| 2005/0075119 A1 * | 4/2005 | Sheha et al. | 455/456.6 |
| 2005/0222755 A1 * | 10/2005 | Tengler et al. | 701/201 |
| 2006/0223529 A1 * | 10/2006 | Yokota et al. | 455/433 |

FOREIGN PATENT DOCUMENTS

| | | |
|---|---|---|
| DE | 19638798 A1 | 3/1998 |
| EP | 0978811 A2 | 2/2000 |
| GB | 2369709 A | 6/2002 |
| JP | 8050695 | 2/1996 |
| WO | WO98/54682 A1 | 12/1998 |
| WO | WO01/48725 A1 | 7/2001 |
| WO | WO02/43026 A1 | 5/2002 |
| WO | WO02/071364 A1 | 9/2002 |

* cited by examiner

METHOD AND SYSTEM FOR DETERMINING DISPLACEMENT TIME OF A MOBILE USER TERMINAL EQUIPMENT

The present invention concerns, first of all, a method for determining the travel time of at least one mobile user end device in accordance with the preamble of patent claim 1 as well as the preamble of patent claim 17. Furthermore, the invention concerns a system for determining the travel time of at least one mobile user end device in accordance with the preamble of patent claim 21. Finally, the invention also concerns a computer program product.

Methods and systems of this kind are employed, for example, to determine the travel time of a vehicle between a selected starting point and an end point that is spatially separated from it.

Known, for example, are solutions in which the travel time of a vehicle is recorded by means of stationary radar sensors. Here, the vehicles pass the sensors, which, in turn, are mounted on the roads. The sensors measure, for example, the speed, the traffic density, and similar data and, in the event of anomalies, transmit a message to a central processing unit. There, the data are collected and processed into a corresponding pattern of the traffic situation.

Known from JP A 080 50 695, for example, is a system in which the travel time of a vehicle is determined by first dividing the distance between a starting point and a destination point into a plurality of distance segments. The individual distance segments are furnished with corresponding sensor elements, by means of which the vehicle speed is determined. On the basis of these data, a corresponding travel time is determined for each distance segment. Subsequently, a travel time for the entire distance between starting point and destination point is determined from the individual travel times per distance segment.

Described in accordance with another solution, described in EP A 0 978 811, is a method as well as a device for determining the travel time of motor vehicles. In this process, the travel time of the vehicle on a distance segment of a traffic route results from the difference between the departure time and the arrival time. For the determination of these times, it is provided that the motor vehicles are optically recorded individually and automatically in the traffic flow by means of a video camera at specific control points of the distance segment along the site of approach or of departure. The pictorial information is converted into image data and provided with a time marker. The travel time of the motor vehicle is determined from this acquired information in a central processing unit.

Known in accordance with another solution, for example, is an acquisition of traffic data by means of distributed detection sensors. For example, so-called "floating cars" are involved in the case of such detection sensors. "Floating cars" are vehicles that are equipped with suitable devices. These devices in the form of correspondingly designed detection sensors generate positional data by measuring their position by GPS, for example. The positional data determined in this way are then transmitted to a central processing unit, for which purpose the detection sensors communicate at least temporarily with the central processing unit. In this process, the individual positional data are acquired by the central processing unit and further processed into corresponding traffic information.

However, all of the solutions described above have the drawback that, on the one hand, they are very complicated and, on the other hand, they are very cost-intensive. Thus, in all cases, it is necessary, for example, to create a special infrastructure. To this end, either special user end devices have to be made available or else a special communication network for the user end devices is required.

Data acquisition by means of stationary sensors necessitates, for example, significant investment in sensors. Furthermore, the application of such a solution to areas with existing sensor technology is limited. Data acquisition by means of "floating car" technologies necessitates the participation of a sufficiently large number of correspondingly equipped vehicles. Furthermore, for wide-area operation, such a solution entails high costs for the wireless communication of the "floating cars" with the analyzing central processing unit.

The present invention is therefore based on the problem of further developing a method and a system of the kind mentioned in the beginning in such a manner that the drawbacks described in connection with the prior art can be avoided. In particular, it should be possible in a simple and cost-advantageous way to determine the travel time of mobile user end devices.

This problem is solved in accordance with the invention by the method with the characteristics according to the independent patent claim 1, the method with the characteristics according to the independent patent claim 17, the system with the characteristics according to the independent patent claim 21, and the computer program product with the characteristics according to the independent patent claim 22. Additional advantages, characteristics, details, aspects, and effects of the invention ensue from the subclaims, the description, and the drawings. Here, characteristics and details that are described in connection with the method in accordance with the invention also obviously apply in connection with the system in accordance with the invention and vice versa in each case. An analogous situation applies to the computer program product in accordance with the invention.

The invention is based on the knowledge that the problem can be solved by being able to utilize specific information of user end devices, particularly information that is produced in any case during their operation, in order to determine their travel time therefrom.

Provided according to a first aspect of the invention is a method for determining the travel time of at least one mobile user end device between a starting point A and an end point E that is spatially separated from it, this method being characterized in accordance with the invention by the following steps:

a) specific pieces of information of at least one mobile user end device located at a starting point A are determined and each is linked to a time marker TA;

b) specific pieces of information of at least one mobile user end device located at the end point E are determined and each is linked to a time marker TE;

c) the specific pieces of information of the at least one mobile user end device located at the starting point A and at the end point E are compared with one another electronically in at least one central processing unit; and d) when there is agreement between the specific pieces of information of a mobile user end device at the starting point A and at the end point E, the time difference TE−TA between the time marker TE and the time marker TA is formed and the travel time is determined from it electronically in the central processing unit.

In this way, it becomes possible to determine the travel time of the mobile user end device in a simple and cost-advantageous manner, without the necessity of having a special infrastructure for this. In order to determine the travel time, specific pieces of information of the mobile user end devices are determined and analyzed. What is involved in the case of such specific pieces of information is information that accrues in any case during the operation of the user end devices. The method can therefore be employed anywhere where corresponding user end devices are located. Some non-limiting examples of this will be described in greater detail in the further course of the description.

The basic idea of the present invention consists, first of all, in the fact that details on travel times can be obtained without the necessity of localizing the user end devices permanently and precisely. When the travel time of at least one mobile user end device between a starting point A and an end point E that is spatially separated from it is to be determined, specific pieces of information of at least one mobile user end device located at the starting point A are determined initially in a first step and each is linked to a corresponding time marker TA. In this process, the invention is not restricted to certain specific pieces of information of the mobile user end devices. It is only important that the mobile user end devices can be identified and characterized unequivocally on the basis of the specific pieces of information determined. These pieces of information are then linked to a corresponding time marker. In this way, it is possible to determine that the user end device was located at a specific point of time, which corresponds to the time marker TA, at the starting point A.

In the same way, according to a further step of the method in accordance with the invention, specific pieces of information of at least one user end device located at the fixed end point E are determined and each linked to a time marker TE. In this way, it is possible to establish that such a mobile user end device was located at the end point E at a specific point of time, which corresponds to the time marker TE.

The specific pieces of information, acquired in this way, of the at least one mobile user end device located at the starting point A and at the end point E are compared with one another electronically in at least one central processing unit.

In this way, it is checked whether the respective specific pieces of information and thus ultimately the user end devices associated therewith are in agreement.

When the specific pieces of information of a mobile user end device at the starting point A and at the end point E are in agreement, this means that one and the same user end device was located both at the starting point A and at the end point E. If such an agreement is established, the time difference TE−TA between the time marker TE of the mobile user end device at the end point and the time marker TA of the mobile user end device at the starting point is formed electronically in the central processing unit. Subsequently, the travel time of the mobile user end device between the starting point A and the end point E that is spatially separated from it is determined from the resulting time difference. How this can occur in detail will be explained in greater detail on the basis of non-limiting examples in the further course of the description.

The present invention is not restricted to a particular number of user end devices. In order to carry out the method, it is already sufficient when only a single user end device is present. Obviously, the method can also be employed advantageously in the case when a larger number of user end devices are present.

It is especially advantageous when the greatest possible number of user end devices is made available. Possible in this way is an especially simple and yet precise geographical assignment of user end devices, as will be explained in greater detail in the further course of the description.

Furthermore, the invention is not restricted to a specific kind of design of user end devices. In principle, it is possible to use any kind of mobile user end devices for which specific pieces of information can be generated. These specific pieces of information must be able to individually identify the respective user end device. Furthermore, it is advantageous that the specific pieces of information generated should also be suitable for further processing. Some non-limiting examples of suitable user end devices will be explained in greater detail in the further course of the description.

With the method in accordance with the invention, it is primarily possible to determine the current travel times of user end devices. In this method, it is not absolutely necessary to compare the determined travel times with corresponding reference data in order to thereby generate corresponding information, such as, for example, traffic information or the like. Nonetheless, the method in accordance with the invention can be employed for such purposes as well.

Advantageously, the specific pieces of information of the mobile user end devices can be acquired electronically. The linking of the specific pieces of information to corresponding time markers can also take place electronically. The analysis of the information as well as the determination of the time difference between the individual time markers and thus the formation of the travel time can take place advantageously in the central processing unit automatically.

The method can be conducted advantageously with the assistance of suitable program means, such as, for example, software, or at least thereby supported.

Preferably, the method can be carried out by use of an information system, particularly a communication system, whereby the travel time is determined from specific data of the mobile user end devices of the information transmitting system. An independent system is advantageously involved in the case of the information transmitting system. The invention is not restricted hereby to specific types of information transmitting systems. However, the information transmitting system has to be designed in such a way that specific pieces of information of the user end devices can be determined. Suitable information transmitting systems are, for example, systems for the transmission of signals, such as, for example, systems for the transmission of data, of wireless signals, and of the like. The user end devices can involve, for example, portable computers, PDAs (personal digital assistants), and the like.

Particularly advantageously, the method can be carried out by the use of a mobile wireless system, particularly a cellular mobile wireless system, whereby the mobile user end devices are designed as mobile phones and whereby the travel time is determined from specific data of the mobile phones. When a mobile wireless system is employed, the specific pieces of information of the user end devices, designed as mobile phones, can be formed, for example, from information in relation to the mobile phones—for example, in relation to the movement of the mobile phones, such as their movement between different cells (handover between cells) and/or within one cell, the time-dependent and/or local distribution of the mobile phones, the number and/or density of the mobile phones per cell, the call setup rate, and/or disconnect rate, and the like. Naturally, it is also conceivable to record the call rate for particular calling numbers as information to be acquired.

When the method in accordance with the invention is employed by use of a mobile wireless system in order to determine, for example, the travel time of vehicles between a starting point and an end point, it is henceforth no longer necessary to provide a high positional precision in order to separate the positioned mobile subscribers into automobile driver and others. How this can take place in detail will be explained in greater detail in the further course of the description.

Advantageously, it is possible to acquire specific pieces of information, in each case, of all mobile user end devices located at the starting point A and/or the end point E and to provide these with a corresponding time marker TA, TE.

Preferably, the specific pieces of information of the at least one mobile user end device located at the starting point A and at the end point E can be transmitted to the central processing unit or generated electronically in the central processing unit. When the specific pieces of information are generated within the user end devices, the latter preferably have available their own central processing unit, in which the information of the individual user end devices is collected and subsequently compiled into the corresponding specific pieces of information. In such a case, the specific pieces of information that have already been finished are transmitted to the central processing unit that communicates at least temporarily with the mobile user end devices.

When the specific pieces of information of the mobile user end devices are determined within the central processing unit, the individual pieces of information of the mobile user end devices are transmitted initially to the central processing unit. There, the corresponding specific pieces of information are generated for each mobile user end device.

Advantageously, the starting point A and/or the end point E can be fixed in the form of a geographical value. This can involve, for example, a special, spatially defined site. Such sites can be, for example, particular cities, particular roads, and particular geographical reference points, such as bridges, special structures, and the like. Naturally, the starting point and/or end points can be fixed in another way as well.

When the method is carried out in connection with a mobile wireless system, the starting point A can be designed, for example, as one cell of a mobile wireless system. In this case, the end point E is designed advantageously as another cell of the mobile wireless system that is spatially separated from the first cell. In another embodiment, it can also be provided that the starting point A is designed as a first boundary of a particular cell of the mobile wireless system, while the end point E is designed as a second boundary of the same cell.

The invention is not restricted to a specific embodiment for the starting points and/or end points, so that the examples mentioned above do not have any limiting character whatsoever.

In another embodiment, an action profile can be determined for the at least one mobile user end device at the starting point A and/or the at least one mobile user end device at the end point E from specific pieces of information for these, whereby each action profile is linked to a time marker TA, TE. Advantageously, the action profile of the mobile user end device can be determined in this method from location information and/or activity information of the user end device. When what is involved in the case of the mobile user end device is a mobile phone within a mobile wireless network, this information can, for example, be the network load in selected areas—for example, in specific mobile wireless cells.

In connection with mobile phones, the action profiles mentioned above can involve, for example, the so-called "call data records" of the mobile wireless system. For all mobile phone calls, the beginning and the end (and thus the length) of the call as well as the position of the mobile phone at the beginning of the call and its position at the end of the call are recorded and analyzed.

Furthermore, it is conceivable that positional data of the mobile user end devices are generated and subsequently compiled into a positional profile. It is also conceivable to generate information in relation to the movement of a time-dependent and/or local distribution, of a number and/or density per unit area of mobile end devices, and to compile this information into corresponding action profiles.

When the method is operated in connection with a mobile wireless system—in particular, a cellular mobile wireless system—it is fundamentally possible to utilize, as specific pieces of information of the user end devices designed as mobile phones in this case, all information that accrues in the framework of the basic way in which the mobile wireless system functions. Included here, in addition to the information mentioned above, are also real-time registration and cell activity data of active mobile end devices. These are received, as a rule, by corresponding base stations, which, in turn, are assigned to individual cells of the mobile wireless system. The received data are relayed through the respective base stations to a central processing unit, where they are further processed. In particular, the base stations receive data from those mobile phones that are located just then in one cell in each case. It is not absolutely necessary here that a telephone call is also just then in process by means of the mobile phone in order to determine specific pieces of information. Instead, it is sufficient when the mobile phone is in an active state, that is, when it is switched on. In such a case, the mobile phone sends out, at regular intervals, so-called registration signals, which are then registered by base stations located in the vicinity and relayed to the central processing unit. A basic functional mode of a cellular mobile wireless system is involved here. Such registration data are also suitable in a particularly advantageous manner as specific pieces of information of the user end devices.

Advantageously, such an action profile as that described above can be determined in the mobile user end device associated therewith or in the central processing unit. When the action profiles are determined in the central processing unit, the individual user end devices can be produced more simply and thus also at more favorable cost. They merely have to be capable of generating specific pieces of information and of relaying this information to the central processing unit. The actual analysis and further processing of the specific pieces of information into the action profiles then takes place centrally in the central processing unit.

In another embodiment, the central processing unit can have at least one computing unit with one or more electronic computers. In this case, the travel time can be determined electronically in the at least one computing unit. When several computing units are used, these can be or can become preferably interconnected to form a single computing network.

Preferably, specific time marker-linked pieces of information or action profiles of each mobile user end device and/or the travel times determined therefrom can be filed in the form of comparison data at least temporarily in a comparison file. This comparison file can be stored at least temporarily, for example, in a memory storage device. The memory storage device can, in turn, be assigned at least temporarily to the central processing unit. For example, the memory storage device can involve a component of the central processing unit. However, it is also possible that the memory storage device of the central processing unit is designed to be spatially separate and that the central processing unit accesses this memory storage device at least temporarily.

Beyond this, the comparison data, for example, can be subjected to a weighting step in the central processing unit.

In another embodiment, it can be provided that a geographical and/or user-specific assignment is generated in the central processing unit on the basis of the comparison data.

For example, a kind of histogram may be involved in this case, in which the number of mobile user end devices is plotted over the travel time.

In another embodiment, specific time marker—linked bits of information or action profiles of each mobile user end device and/or the travel times determined therefrom and/or the comparison data generated therefrom can be compared with corresponding reference values within the central processing unit. The reference values can be stored here advantageously in a suitable memory storage device or become or be filed.

Advantageously, it is provided in the method described above that the travel time is determined in a continual manner. Furthermore, it can be provided that the travel time also is updated in a continual manner.

Provided according to a second aspect of the invention is a method for determining the travel time of at least one mobile user end device between a starting point and a destination point that is spatially separated from it, this method being characterized in accordance with the invention in that the distance between the starting point and the destination point is subdivided into two or more distance segments S, each having a starting point A and an end point E, in that the travel time within each distance segment S is determined in a way described above in accordance with the invention, in that the individual travel times of the distance segments are summed up in the central processing unit, and in that the total travel time is determined from the sum of the individual travel times.

In this method, it is possible in a simple and cost-advantageous way to determine the travel time between a starting point and a destination point with at least one mobile user end device. To this end, it is provided, first of all, that the distance between the starting point and the destination point is subdivided into a number of distance segments. Each distance segment, in turn, has a starting point and an end point, whereby, advantageously, the end point of one distance segment represents the starting point of the following distance segment.

The travel times of the mobile user end devices are determined in the way described above in connection with the method according to the first aspect of the invention, so that the full content of the preceding descriptions is invoked and herewith reference is made thereto.

The respective travel times of the individual distance segments are summed up in the central processing unit, whereby the total travel time is determined from the sum of the individual travel times.

Advantageously, it is provided that the individual travel times are determined in a continual manner and that the total travel time is updated in a continual manner on the basis of the travel times within the distance segments.

In this way it is possible to provide always a current travel time between a starting point and a destination point. When the travel time of mobile end devices within a distance segment changes, this change in time flows immediately into the total travel time, so that the latter also changes accordingly.

In connection with the two aspects of the invention described above, it can be advantageous that traffic information is generated in the central processing unit on the basis of the travel time(s) determined and/or the total travel time(s) determined. When the method is carried out by use of a mobile wireless system, it is possible in particular here to acquire traffic data without map matching, solely from the data of the mobile wireless network. However, the invention is not restricted here to specific types of traffic information. For example, traffic information can be generated not only through the travel time that is currently to be expected, through current traffic situations, and thus through the status quo. It is also conceivable to generate traffic information that allows predictions on traffic situations that are to be expected in the future.

Furthermore, it can be provided that the specific time marker-linked pieces of information or action profiles of each mobile user end device and/or the travel times determined therefrom and/or the comparison data generated therefrom and/or the total travel times determined and/or the generated traffic information is (are) transmitted from the central processing unit to selected or to all mobile end user devices. In the first case, it is possible to provide the corresponding information only to those users that have subscribed to a corresponding service provider.

The methods described above in accordance with the invention have, in addition to the advantages already mentioned, a number of further advantages. When the methods are employed, for example, for the generation of traffic data, it is possible to make available the travel times of vehicles even without the presence of traffic jams. This is important, for example, for statistical purposes or for the differentiation of heavy, sluggish, or stop-and-go traffic. Furthermore, it is possible to dispense with the differentiation between automobile drivers and other subscribers, because a positional accuracy of the individual mobile user end devices is not required. Instead, the geographical assignment of the mobile user end devices can occur in an indirect way, as basically explained below on the basis of a non-limiting example, without the invention being restricted to the example mentioned.

According to this example, travel times of mobile user end devices are to be determined by use of a mobile wireless network, wherein the individual user end devices are designed as mobile phones. Fixed in this process is, first of all, a distance segment, which is bounded by a starting point A and an end point E. The starting point A and the end point E can each involve, for example, one cell of a mobile wireless system, whereby the individual cells are spatially separated from one another and whereby additional cells can lie between the individual cells.

Both in the cells serving as starting point A and in the cells serving as end point E, specific pieces of information of all mobile phones that are active in the respective cells are determined in a continual manner. The specific pieces of information determined in each case are relayed to the central processing unit.

Beyond this, the respective specific pieces of information of each mobile phone are each provided with a corresponding time marker.

In the central processing unit, the specific pieces of information of all mobile phones, particularly those of the mobile phones located in the starting cell as well as the end cell, are compared with one another—preferably in a continual manner. If, during this, a disagreement arises, then this means that the corresponding mobile phone has moved from the cell serving as starting point into the cell serving as end point. In order to determine the travel time, the time difference is determined from the corresponding time markers and this represents a measure of the period of time required for the mobile phone to reach the end point from the starting point.

Now, it is fundamentally conceivable that a mobile phone can move from the starting point to the end point in different ways. Thus, it is conceivable, for example, that the active mobile phone moves from the starting point to the end point along a highway, a main road, a side road, with a break in the journey, without a break in the journey, by train, by bicycle, by foot, or the like.

The individual pieces of time information are therefore filed in a comparison file designed as a histogram, whereby, in this histogram, the number of active mobile phones is plotted over the travel time. In this way, first of all, all of those mobile phones that indeed are located at the starting point but do not move in the direction of the end point drop out of the analysis. Furthermore, it can be assumed that at the maximum of the histogram are located all of those mobile phone subscribers that, in the example mentioned, are located on the highway. In this way, it is possible, for example, to assign a specific traveling time to a portion of the highway located between a starting point and an end point.

Naturally, there can also arise the situation that a correspondingly high number of active mobile phones are in motion between the starting point A and the end point E. In order to avoid making the mistake of drawing the conclusion of a traveling time on a portion of the highway, it is possible to provide, for example, corresponding timetable data of trains as comparison data, so that the determined travel times can be checked in a continual manner against such timetable data. In this way, a false assignment of travel times is effectively prevented.

Then, when a traffic jam forms on a part of the highway between the starting point A and the end point E, the maximum of active mobile wireless subscribers requires a correspondingly longer time to arrive at the end point E from the starting point A, that is, to arrive in the end cell from the starting cell. Accordingly, the maximum shifts to a longer length of time.

For each distance segment between a starting point A and an end point E, it is possible in this way to determine the travel time, so that a current travel time is always known for the corresponding distance segment.

In this way, it is possible to provide a dynamic travel time between the starting point A and the end point E, which adapts to the external circumstances. Furthermore, it is also possible in this way to generate specific pieces of information on possible traffic jams, which can than be analyzed and further processed in a suitable manner.

Provided according to a third aspect of the invention is a system for determining the travel time of at least one mobile user end device between a starting point A and an end point E that is spatially separated from it and/or for determining the travel time of at least one mobile user end device between a starting point and a destination point that is spatially separated from it, wherein the distance between the starting point and the destination point is subdivided into one or more distance segments S, each having a starting point A and an end point E, whereby the system is characterized in accordance with the invention by a means for carrying out the processes described above in accordance with the invention. These means can involve, for example, component parts of at least one electronic computer, electronic structural elements, components, switches, switch parts, and suitable program means, such as, for example, software, and the like.

Provided according to a further aspect of the invention is a computer program product with a program medium that can be read by a computer and that, when the program is loaded, has a program means for carrying out the methods described above in accordance with the invention. Such a computer program product, for example, can be loaded from a corresponding memory storage device or from the Internet or the like onto or into the computer.

Figure 2:
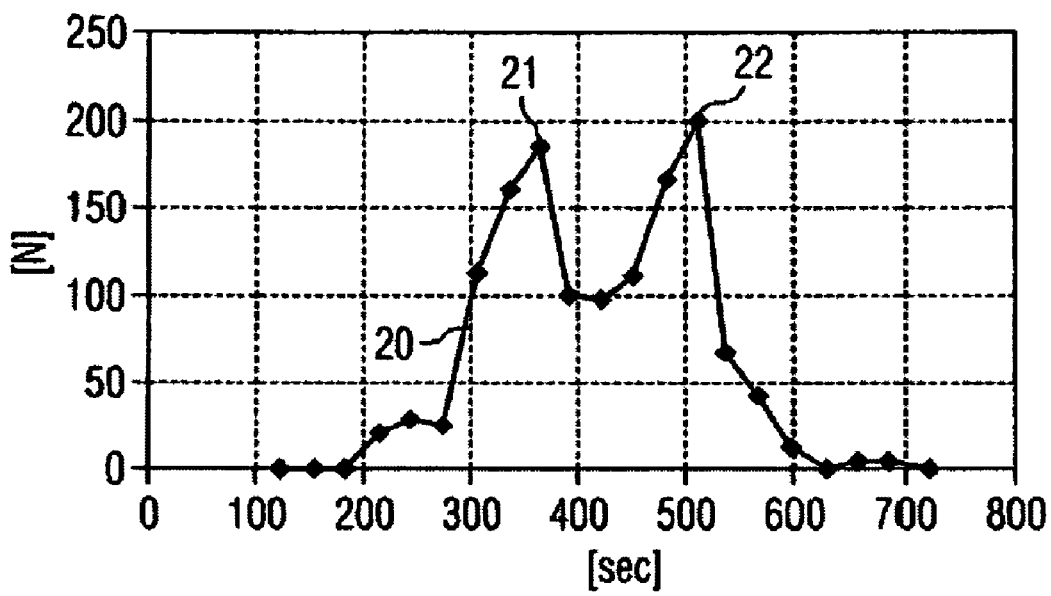
Figure 3:
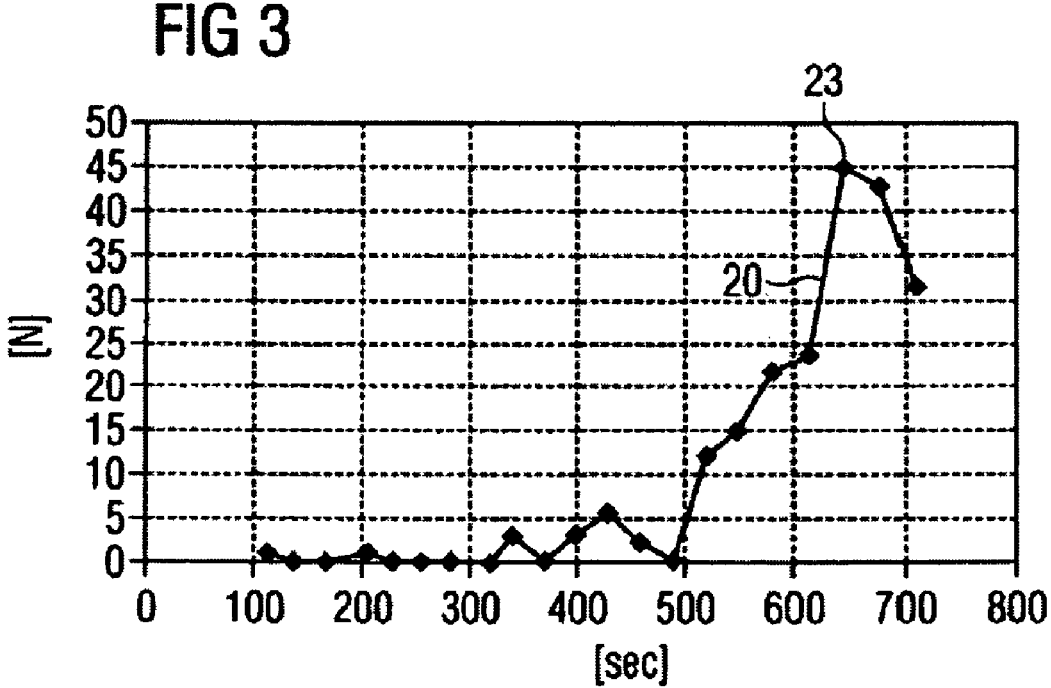

The invention will now be explained in greater detail on the basis of embodiment examples taking into consideration the accompanying drawing. Shown therein are the following:

FIG. 1 shows, in schematic representation, a section of a cellular mobile wireless system; and FIGS. 2 and 3 show diagrams in which the number of active mobile wireless subscribers is plotted over the travel time, whereby, in FIGS. 2 and 3, different states prevail on the roads in each case.

Represented in FIG. 1 is, first of all, a section of a cellular mobile wireless system 10, wherein the mobile wireless system 10 is made up of a number of mobile wireless cells 11, 12, 13. Each of these cells 11, 12, 13 covers a particular geographical area. The individual cells 11, 12, 13 communicate with corresponding base stations (not represented), which, in turn, communicate with at least one central processing unit (also not represented).

Information can be acquired and analyzed, via the base stations and the central processing unit, on all active mobile phones in the individual cells 11, 12, 13 in each case.

In the present embodiment example in accordance with FIG. 1, one region of the mobile wireless system 10 is represented; it is located in the area around Karlsruhe. As can be seen from FIG. 1, the region of the mobile wireless system 10 shown is crossed by two highways, namely, on the one hand, the highway A5 and, on the other hand, the highway A8.

The travel time of vehicles on the highways is now to be determined by means of the mobile wireless system 10. To this end, the highway distances are first subdivided into a number of distance segments S, whereby each distance segment is bounded by a starting point A and an end point E. In order to make possible a determination of travel time that is as free of gaps as possible, the end point E of one distance segment S advantageously forms, at the same time, also the starting point A of the following distance segment. In the present embodiment example in accordance with FIG. 1, only a single distance segment S is represented for better clarity. However, it is obvious that the following description applies by analogy also to distances with several distance segments. In this case, the travel times for each distance segment are determined and subsequently added together to form the total travel time.

For the distance segment S that is represented in FIG. 1 and is to be investigated, the starting point A is formed by a specific cell 12 of the mobile wireless system 10. The end point E of the distance segment S is likewise formed by another cell 13 of the mobile wireless system 10, whereby the cells 12 and 13 are spatially separated from each other. Depending on the form of the distance segment S, it can be provided that the cells 12, 13 are arranged directly adjacent to each other. It is equally conceivable, as shown in the present example, that yet additional cells 11 of the mobile wireless system are located between the individual cells 12, 13.

In order to then determine the travel time of a vehicle on the highway between the cell 12 and the cell 13, specific pieces of information in regard to active mobile phones are determined at first in a continual manner and transmitted via the corresponding base stations to a central processing unit. In the present example, specific pieces of information can be acquired from all active mobile phones that are located in the cell 12 or 13. On the basis of the specific pieces of information, a precise definition and individual identity of the individual mobile phones is possible. In order to be able to determine travel times, each specific piece of information of an active mobile phone in the cell 12, or in the cell 13, is furnished with a corresponding time marker. In the present embodiment example, this means that all active mobile phones that are located in the cell 12, serving as starting point, are each furnished with a time marker TA. Likewise, all active mobile phones located in the cell 13, functioning as end point, are furnished with a time marker TE.

In the central processing unit, then, the individual specific pieces of information of all active mobile phones are compared with one another electronically. When specific pieces of information of one mobile phone, which was originally located in the starting cell 12, are determined at a later point of time in the end destination 13 as well, this means, first of all, that the mobile phone has moved in some way from the cell 12 to the cell 13. Because all active mobile phones are furnished at each time with a corresponding time marker, this also means that, for the mobile phones mentioned, both a time marker TE in the end cell 13 and a time marker TA in the starting cell 12 is present. On agreement of the specific pieces of information, the time difference TE—TA between the time marker TE and the time marker TA is now formed electronically in the central processing unit. This time difference then constitutes the travel time of the mobile phone from the starting cell 12 to the end cell 13.

The specific pieces of information to be taken into consideration in determining the travel time can involve diverse pieces of information that accrue in any case and are analyzed in connection with the operation of mobile phones or of the mobile wireless system 10.

As ensues from the example represented in FIG. 1, however, it is initially not absolutely certain whether all mobile phones that move from the starting cell 12 to the end cell 13 are also doing this over the highway. Also, it is not absolutely essential that all active mobile phones located in the starting cell 12 indeed are also moving toward the end cell 13. In the example represented, individual mobile phones could be moving, for example, also in the direction of the highway A5, so that such mobile phones will never reach the end cell 13.

Therefore, there has to be created a possibility as to how the individual mobile phones can be brought geographically into connection with the highway. This can be done, for example, in a way that is represented in FIGS. 2 and 3. FIGS. 2 and 3 each represent histograms, in which, in general, a number of active mobile phones [N] is plotted over the time in seconds.

Represented in each of FIGS. 2 and 3 are curves 20, in which the travel times of active mobile phones between the starting cell 12 (the starting point A) and the end cell 13 (the end point E) are plotted. Such mobile phones are, in fact, registered in the starting cell 12, but they never reach the end cell 13 and consequently are not registered in the curves in accordance with FIGS. 2 and 3. In FIGS. 2 and 3, the mobile phones that are registered are those that actually have moved from the starting cell 12 toward the end cell 13 and have also reached the latter within a certain period of time.

The histograms represented in FIGS. 2 and 3 are filed in the central processing unit in the form of comparison data and can be worked or processed in the central processing unit.

In each of the digital histograms according to FIGS. 2 and 3, the time differences TE–TA for all mobile phones that have moved from the starting cell 12 toward the end cell 13 are processed. Accordingly, each mobile phone has its own travel time from the starting cell 12 toward the end cell 13. As can be seen in FIGS. 2 and 3, there exists a large bandwidth of different time differences and thus determined travel times. In each of the curves, however, there result individual maxima for those typical travel times that are reached by most mobile phones and thus active subscribers in the mobile wireless system 10.

Because, in the embodiment example, the highway represents the quickest connection between the starting cell 12 and the end cell 13, it can be assumed that most of the active mobile phones in travel are to be assigned to automobile drivers who are moving on the highway. A maximum in active mobile phones, all of which require the same travel time between starting cell 12 and end cell 13, can accordingly be linked to a portion of the highway between starting cell 12 and end cell 13. This means that that the travel time between the starting cell 12 and the end cell 13 that is required by the maximum for the active mobile phones represents the travel time on the distance segment S formed as the highway portion. Other isolated travel times can be caused by extremely slow vehicles, by traffic on another route, or the like. These travel times can be ignored, however, because, for the determination of the travel time on the highway between the starting point A and the end point E, only the maximum is of importance. Then, when the maximum shifts, this means that the travel time on the distance segment S between the starting point A and the end point E has become longer on account of, for example, a traffic disruption or the like.

The curve 20 represented in FIG. 2 involves a linking of the active mobile wireless subscribers to the travel time that these have required for the route from the starting point A to the end point E. As already presented above, what is involved in the case of each of the curve maxima are those mobile wireless subscribers who use the highway. As can be seen in the curve 20 according to FIG. 2, a total of two maxima 21 and 22 are displayed. This means that, on the highway distance segment S between starting cell 12 and end cell 13, active mobile phones located in vehicles of different speed categories are moving. For example, truck and automobile traffic are conceivable here.

The two maxima 21 and 22 of curve 20 lie at different travel times. The shorter travel times, for example, may be assigned to the automobile traffic, whereas the longer travel times, for example, may be assigned to the truck traffic. In the exemplary example according to FIG. 2, the maximum 22 lies at about 510 seconds, whereas the maximum 21 lies at about 360 seconds. In the present example, this might mean that trucks require a travel time of 510 seconds and automobiles require a travel time of 360 seconds in order to go from the starting cell 12 to the end cell 13.

For comparison to this, a second histogram of the same distance segment S at another time is represented in FIG. 3. As can be seen in FIG. 3, in the exemplary situation represented, there now prevails only a single maximum 23, which lies at about 650 seconds. This means that, once again, the maximum of all active mobile phones is moving over the highway distance segment S, and that all mobile phones on the highway require the same travel time. To continue on with the example according to FIG. 2, this may mean that both the otherwise faster automobiles and the otherwise slower vehicles (trucks) require an identical travel time. It can be concluded from this that, on the distance segment S between the starting point A and the end point E, a higher volume of traffic prevails than in the case of FIG. 2, so that a significantly longer travel time is determined via the central processing unit for the distance segment S.

The travel times determined in each case per distance segment S are advantageously determined and updated in a continual manner. Thus, at any arbitrary point of time, the precise, actual travel time on the distance segment S is known.

The method in accordance with the invention can thus be employed, first of all, to determine solely the travel times to be expected on individual distance segments S or on total distances formed from several distance segments, at the same time, without the necessity of making statements about the currently prevailing traffic situations. Because the travel time can change dynamically within each distance segment S over time, a user of the system can learn at any time how long he will require in order to go from a starting point to a destination point.

Furthermore, the determined travel times can also be stored in memory, so that they can be used at a later point of time as reference values. Through the comparison of currently determined travel times with corresponding reference values, it is possible, for example, to generate traffic information on, for instance, whether or not a traffic jam prevails on the distance segment. Furthermore, reference values can also be used in order to prepare forecasts for the future.

Because only the maxima 21, 22, or 23 of the curves 20—and thus a relative comparison—is required for the determination of the travel time on the highway between the starting point A and the end point E, the method can be employed in a particularly simple and cost-advantageous manner for the determination of the travel time, because a precise positioning of the individual mobile phones is not required. Also, the number of the active mobile phones in the monitored distance segment S in each case does not play any role. For the example according to FIG. 2, for example, substantially more active mobile phones are registered than is the case in the example according to FIG. 3. However, because only the relative comparison between the individual travel times is always taken into consideration, this comparison is possible both for a large number and for a small number of active mobile phones.

Thus, the method in accordance with the invention makes possible a determination of the travel time on particular distances—in the present case, on the highway between the starting point A and the end point E—this traveling time resulting solely from the acquisition of data from the mobile wireless system, whereby the data utilized here is only data that accrues in any case during the operation of the mobile wireless system 10. A precise geographical positioning of the determined information, also referred to as map matching, is not necessary.

LIST OF REFERENCE NUMBERS

10=mobile wireless system
11=cell
12=cell
13=cell
20=curve, for which the number of mobile wireless subscribers is plotted over the travel time
21=maximum
22=maximum
23=maximum
A=starting point
E=end point
S=distance segment between a and e

The invention claimed is:

1. A method for determining the travel time of mobile user end devices in a pre-determined distance segment (S) between a pre-determined starting point (A) and a pre-determined end point (E) that is spatially separated from it, this method being characterized in accordance with the invention by the following steps:
   a) the pre-determined starting point (A) is designed as a cell (12) of a mobile wireless system (10) and the pre-determined end point (E) is designed as another cell (13) of the mobile wireless system (10) that is spatially separated from it;
   b) specific pieces of information of at least one mobile user end device located at a starting point (A) are determined and each is linked to a time marker (TA);
   c) specific pieces of information of at least one mobile user end device located at the end point (E) are determined and each is linked to a time marker (TE) wherein the time marker-linked, specific pieces of information or action profiles of each mobile user end device or the travel times determined therefrom are filed in the form of comparison data at least temporarily in a comparison file;
   d) the specific pieces of information of at least one mobile user end device located at the starting point (A) and at the end point (E) are compared with one another electronically in at least one central processing unit; and
   e) when there is agreement between the specific pieces of information of a mobile user end device at the starting point (A) and at the end point (E), the time difference (TE−TA) between the time marker (TE) and the time marker (TA) is formed and the travel time is determined from it electronically in the central processing unit.

2. The method according to claim 1, further characterized in that this is carried out by use of an information transmitting system, in particular a communication system, whereby the travel time is determined from specific data of the mobile user end devices of the information transmitting system.

3. The method according to claim 1, further characterized in that this is carried out by use of a mobile wireless system (10), in particular a cellular mobile wireless system, wherein the mobile user end devices are designed as mobile phones and wherein the travel time is determined from specific data of the mobile phone.

4. The method according to claim 1, further characterized in that the specific pieces of information of the at least one mobile user end device located at the starting point (A) and at the end point (E) are transmitted to the central processing unit or are generated electronically in the central processing unit.

5. The method according to claim 1, further characterized in that the starting point (A) and the end point (E) is fixed in the form of a geographical value.

6. The method according to claim 3, further characterized in that the starting point (A) and the end point (E) is fixed in the form of a geographical value.

7. The method according to claim 3, further characterized in that the starting point (A) and the end point (E) is fixed in the form of a geographical value and further characterized in that the starting point (A) is designed as a first boundary of a cell (11) of the mobile wireless system (10) and that the end point (E) is designed as a second boundary of the same cell (11).

8. The method according to claim 1, further characterized in that an action profile is determined for the at least one mobile user end device at the starting point (A) and for the at least one mobile user end device at the end point (E) from specific pieces of information for these and that each action profile is linked to a time marker (TA, TE).

9. The method according to claim 8, further characterized in that the action profile is determined in the mobile user end device associated therewith or in the central processing unit.

10. The method according to claim 1, further characterized in that the central unit has at least one computing unit with one or more electronic computers and that the travel time is determined electronically in the at least one computing unit.

11. The method according to claim 1, further characterized in that the comparison data are subjected to a weighting step in the central processing unit.

12. The method according to claim 1, further characterized in that, in the central unit, a geographical or user-specific assignment is generated on the basis of the comparison data.

13. The method according to claim 1, further characterized in that the time marker-linked, specific pieces of information or action profiles of each mobile user end device or the travel times determined therefrom or the comparison data generated therefrom are compared with corresponding reference values within the central processing unit.

14. The method according to claim 1, further characterized in that the travel time is determined in a continual manner and in that the travel time is updated in a continual manner.

15. A method for determining the travel time of at least one mobile user end device between a starting point and a destination point that is spatially separated from it, characterized in that the distance between the starting point and the destination point is subdivided into two or more distance segments (S), each having a starting point (A) and an end point (E), in that the travel time within each distance segment (S) is determined according to claim 1, in that the individual travel times of the distance segments are summed up in the central processing unit, and in that the total travel time is determined from the sum of the individual travel times.

16. The method according to claim 15, further characterized in that the individual travel times of the distance segments (S) are determined in a continual manner and in that the total travel time is updated in a continual manner on the basis of the travel times within the distance segments (S).

17. The method according to claim 1, farther characterized in that, in the central unit, traffic information is generated on the basis of the determined travel time(s) or the determined total travel time(s).

18. The method according to claim 1, further characterized in that the time marker-linked, specific pieces of information or action profiles of each mobile user end device or the travel times determined therefrom or the comparison data generated therefrom or the total travel times determined or the traffic information generated are transmitted form the central processing unit to selected or to all mobile user end devices.

19. A system for determining the travel time of at least one mobile user end device between a starting point (A) and an end point (E) that is spatially separated from it and/or for determining the travel time of at least one mobile user end device between a starting point and a destination point that is spatially separated from it, wherein the distance between the starting point and the destination point is subdivided into one or more distance segments (S), each having a starting point (A) and an end point (E), characterized by a means for carrying out the process according to one of claims 1–3, 4–10 or 11–18.

20. A computer program product with a program medium that can be read on a computer and that, when the program is loaded, has a program means for carrying out the method according to one of claims 1–3, 4–10 or 11–18.

21. A method for determining the travel time of mobile user end devices between a starting point (A) and an end point (E) that is spatially separated from it, this method being characterized in accordance with the invention by the following steps:
 a) specific pieces of information of at least one mobile user end device located at a starting point (A) are determined and each is linked to a time marker (TA);
 b) specific pieces of information of at least one mobile user end device located at the end point (E) are determined and each is linked to a time marker (TE);
 c) the specific pieces of information of at least one mobile user end device located at the starting point (A) and at the end point (E) are compared with one another electronically in at least one central processing unit;
 d) when there is agreement between the specific pieces of information of a mobile user end device at the starting point (A) and at the end point (E), the time difference (TE−TA) between the time marker (TE) and the time marker (TA) is formed and the travel time is determined from it electronically in the central processing unit; and
 e) the time marked-linked, specific pieces of information or action profiles of each mobile user end device or the travel times determined therefrom are filed in form of comparison data at least temporarily in a comparison file.

22. A method for determining the travel time of mobile user end devices between a starting point (A) and an end point (E) that is spatially separated from it, this method being characterized in accordance with the invention by the following steps:
 a) specific pieces of information of at least one mobile user end device located at a starting point (A) are continuously determined and each is linked to a time marker (TA);
 b) specific pieces of information of at least one mobile user end device located at the end point (E) are continuously determined and each is linked to a time marker (TE) wherein the time marker-linked, specific pieces of information of each mobile user end device or the travel times determined therefrom are filed in the form of comparison data at least temporarily in a comparison file;
 c) the specific pieces of information of at least one mobile user end device located at the starting point (A) and at the end point (E) are continuously compared with one another electronically in at least one central processing unit;
 d) when there is agreement between the specific pieces of information of a mobile user end device at the starting point (A) and at the aid point (E), the time difference (TE−TA) between the time marker (TE) and the time marker (TA) is formed and the travel time is determined from it electronically in the central processing unit.

* * * * *